(12) United States Patent
Yoon et al.

(10) Patent No.: US 7,582,379 B2
(45) Date of Patent: Sep. 1, 2009

(54) SECONDARY BATTERY OF ASSEMBLE-TYPE STRUCTURE

(75) Inventors: Seog jin Yoon, Seoul (KR); Sun Kwang Jung, Seoul (KR); Hyungchan Kim, Seoul (KR)

(73) Assignee: LG Chem, Ltd. (KR)

( * ) Notice: Subject to any disclaimer, the term of this patent is extended or adjusted under 35 U.S.C. 154(b) by 824 days.

(21) Appl. No.: 11/043,554

(22) Filed: Jan. 26, 2005

(65) Prior Publication Data

US 2005/0208345 A1    Sep. 22, 2005

(30) Foreign Application Priority Data

Jan. 28, 2004   (KR)   ............... 10-2004-0005265
Mar. 15, 2004   (KR)   ............... 10-2004-0017342

(51) Int. Cl.
*H01M 2/00*   (2006.01)
*H01M 2/02*   (2006.01)
*H01M 2/04*   (2006.01)
*H01M 2/08*   (2006.01)
*H01M 10/34*  (2006.01)
*H01M 10/48*  (2006.01)

(52) U.S. Cl. ............... 429/163; 429/57; 429/59; 429/90; 429/92; 429/122; 429/162; 429/175; 429/178; 429/185

(58) Field of Classification Search ............... None
See application file for complete search history.

(56) References Cited

U.S. PATENT DOCUMENTS

| 4,911,994 A   | * | 3/1990 | Will et al. | ............... | 429/167 |
| 5,965,292 A   | * | 10/1999 | Kim et al. | ............... | 429/121 |
| 6,524,732 B1  | * | 2/2003 | Iwaizono et al. | ............... | 429/7 |
| 2003/0082441 A1 | * | 5/2003 | Hovi et al. | ............... | 429/123 |

OTHER PUBLICATIONS

Linden et al., Handbook of Batteries, 2002, McGraw-Hill, Third Edition, p. 1.3.*

* cited by examiner

*Primary Examiner*—Dah-Wei D Yuan
*Assistant Examiner*—Katherine Turner
(74) *Attorney, Agent, or Firm*—Cantor Colburn LLP

(57) ABSTRACT

Provided is a secondary battery of an assemble-type structure having a cell body including an electrode assembly of cathode/separator/anode sealed therein; and a cap assembly including a protection circuit electrically connected to the cell body so as to control overcharge, overdischarge and overcurrent of the battery and a cap housing covering an upper part of the battery, and being detachably coupled to the cell body. Since the cap assembly including the protection circuit and cap housing is assembled detachably from the cell body and electrically connected to and also can be physically firmly fixed to one another, provided are effects capable of greatly reducing the manufacturing process steps of the battery, and solving all the problems associated with use of battery cases and insert injection molding.

13 Claims, 15 Drawing Sheets

PRIOR ART

PRIOR ART

PRIOR ART

SECONDARY BATTERY OF ASSEMBLE-TYPE STRUCTURE

FIELD OF THE INVENTION

The present invention relates to a battery pack structure, and more particularly to a battery pack structure wherein each structural component of the battery can be detachably assembled without use of separate assembling instruments.

BACKGROUND OF THE INVENTION

Chargeable/dischargeable secondary batteries are broadly divided into a hard pack type and inner pack type. A typical example of the hard pack battery is shown in FIG. 1. Referring to FIG. 1, the hard pack battery 10 forms an outer portion of an external device 12 on which the battery 10 is mounted, and thus has advantages such as convenient installation of the battery to the external device (12) upon use. However, this battery type has also problems in that it is relatively expensive and shows less compatibility between various products because the battery case (housing 11) should be designed in compliance with kinds of the corresponding external devices under the condition that the cell body (not shown) is built-in.

Unlike the hard pack type, the inner pack battery 20, as shown in FIG. 2, has advantages such as easy design, low production costs and good compatibility, although it has disadvantages in that it is installed inside the external device and is covered by a case which in turn forms a portion of the external device, thus being relatively cumbersome in installation and use of the battery.

More detailed structure of the inner pack battery 20 is illustrated in FIGS. 3 and 4. As shown in FIGS. 3 and 4, the inner pack battery 20 includes a cell body 21 provided with a positive terminal on the one side thereof and a negative terminal on the other side; a positive temperature coefficient (PTC) element 22 connected to either of two electrode terminals of the cell body 21 and providing primary protection of the battery against overcurrent, overdischarge and overcharge; a protection circuit 24 connected to one electrode terminal (either the positive or anode terminal) on the side of the PTC element 22 via a nickel plate 23 and connected to the other electrode terminal via a nickel plate 27 to provide secondary protection of the battery, and having an external input/output terminal formed on the outside thereof to which the corresponding device (not shown) can be connected; top and bottom cases 25 and 26 enclosing the cell body 21, PTC element 22 and protection circuit 24.

Insulating sheets 28 are disposed between the sides of the cell body 21 and nickel plate 23, and between the protection circuit 24 and nickel plate 27, thus being capable of preventing unnecessary contact between the nickel plates 23 and 27 and adjacent cell body 21 or protection circuit 24.

Further, a double-sided tape 29 is disposed between the cell body 21 and bottom case 26, thus enabling the cell body 21 to be closely fixed on the bottom surface of the bottom case 26. Therefore, the cell body 21 is housed and stably secured within the top and bottom cases 25 and 26.

However, the battery having such a structure has suffers from the following problems.

Firstly, in order to keep pace with the continuing trend towards miniaturization, slimness and weight reduction of external devices, such as miniaturization and weight reduction of the cells, smaller and lighter batteries are in great demand. Achieving this goal requires fabrication of a battery case by way of ultra precision injection molding of thin film which is technically difficult and inevitably causes increased production costs.

Secondly, a large number of processes are required for assembly and mounting of the PTC element, nickel plate, protection circuit, top and bottom cases and assembly processes are complicated, thus resulting in high rejection rate and high production costs.

Thirdly, coupling between top and bottom cases is largely performed by ultrasonic welding, and such ultrasonic welding requires that the battery pack have a size larger than a predetermined thickness. Therefore, this requirement serves as an obstacle to realization of miniaturization, light weight and slimness of the battery, and minute flow of top and bottom cases occurring during ultrasonic welding leads to a high possibility of rejection and the necessity of continued maintenance.

As schemes to solve the above-mentioned problems, a method is proposed involving insert injection molding of various components (cap assembly), which are mounted on the upper part of the cell body, in conjunction with the cell body.

Fabrication of the battery using such insert injection molding does not use separate top and bottom cases and thus it is possible to realize reduction in the size of the battery (in particular, thickness). However, since the cap assembly is molded together with the cell body in a mold, there are required a large number of processes for electrical connection between respective components. Further, there are technical difficulty associated with positioning of respective components in place at predetermined sites in the mold and problems associated with damage and stability of the cell body due to contact with a hot melt resin. In addition, when some components are defective, it is substantially impossible to disassemble the battery structure, thus being incapable of fundamentally solving factors responsible for defective items.

SUMMARY OF THE INVENTION

Therefore, the present invention has been made to solve the above problems, and technical problems that have been desired to be solved from the past.

Specifically, it is an object of the present invention to provide a secondary battery having a structure capable of providing a pronounced reduction in rejection rate by means of a highly simplified assembly process of the battery and remarkable reduction in production costs of the battery due to easy replacement of components upon occurrence of defects.

It is another object of the present invention to provide a secondary battery wherein electrical connection between a cell body and respective components can be achieved without welding, due to specific constitutions such as electrode lead.

It is a further object of the present invention to provide a secondary battery having a structure capable of achieving more efficient automation of a battery manufacturing process.

In accordance with an aspect of the present invention, the above and other objects can be accomplished by the provision of a secondary battery of an assemble-type structure, comprising:

(a) a cell body including an electrode assembly of cathode/separator/anode sealed therein; and (b) a cap assembly including a protection circuit electrically connected to the cell body and a cap housing enclosing a portion of the battery, and being detachably coupled to the cell body.

The secondary battery in accordance with the present invention can achieve a significant reduction in the complexity of the assembly process of the battery due to no need for welding to couple the cell body with the cap assembly resulting from detachable coupling of the cap assembly into the cell body. In addition, in accordance with the secondary battery of the present invention, there are also provided advantages such as further reduction in battery size due to no need for a case to receive the cell body (for example, top and bottom cases), no need for ultrasonic welding of cases, and no problems associated with injection molding of the cap assembly in combination with the cell body due to no co-molding thereof.

In the present invention, detachable coupling between the cell body and cap assembly may be accomplished by various constitutions.

As an example of such constitutions, a cap housing of the cap assembly may have a structure in which both sides or the entirety of lateral parts of the cap housing extend downward to the cell body to ensure that the cap housing can be tightly adhered to the upper lateral side of the cell body. Therefore, in the state that the protection circuit is built into the cap housing or the protection circuit is mounted on the upper surface of the cell body, the cell body and cap housing may be coupled to each other in a manner that the upper part of the cell body is fitted into extended lateral parts of the cap housing.

Preferably, the sides of the cell body, to which the extended lateral parts of the cap housing are tightly adhered, may have steps, such that the extended lateral parts of the cap housing do not protrude from the sides of the cell body in the state that the cell body and cap housing are coupled.

More preferably, in order to enhance the coupling degree between the cap housing and cell body, extended lateral parts of the cap housing or the upper part of the cell body may be provided with engagement projections and the upper part of the cell body or the extended lateral parts of the cap housing may be provided with engagement grooves corresponding to the engagement projections.

If necessary, in order to further enhance the coupling degree between the cap housing and cell body and to stably protect coupling sites, packaging labels may be attached to sides of the cell body including coupling sites between the cap housing and cell body.

On the cap housing of the cap assembly, there are formed openings for terminals, through which external connection terminals of the protection circuit are exposed for electrical connection between the external connection terminals and external device, while the protection circuit are coupled to the cap housing. In order to ensure correct coupling of the protection circuit to the cap housing, either of at least two corners of the protection circuit and inner wall of the cap housing enclosing the protection circuit are preferably provided with guide grooves, and projection ribs corresponding to the guide grooves are provided on the other.

In order to further secure safety of the battery, safety elements such as PTC elements, fuses and bimetal may be further provided upon electrical connection between electrode terminals of the cell body and protection circuit.

If desired, in order to prevent short-circuiting due to unnecessary connection between the protection circuit and cell body, an insulating member may be further mounted on the upper surface of the cell body. Although there is no particular limit to kinds of the insulating member, it may take the form of a film, for example and may be a structure on which safety elements are readily mountable.

Where the insulating member is the structure for easily mounting some components of the cap assembly, the insulating structure may take a structure such that it is coupled to the upper surface of the cell body by adhesion, welding, or engagement, to form a portion of the cell body, and the cap assembly is detachably coupled to the insulating structure. In this case, as described above, in order to further enhance the coupling degree between coupled parts, engagement projections are formed on the lateral parts of the cap housing or the insulating structure, and engagement grooves corresponding to the engagement projections are formed on the cell body or cap housing.

Electrical connection between the electrode terminals of the cell body and protection circuit may be realized by various methods. For example, mention may be made of the following.

First, electrical connection may be made by coupling conductive electrode leads with electrode terminals of the cell body and the protection circuit, respectively.

Second, electrical connection may be made by allowing for projection of electrode terminals from the upper part of the cell body and mounting the protection circuit on the cell body.

In the first connection manner, the electrode leads may be separate members or the members mounted on the protection circuit. If the electrode leads are the separate members, one side of the electrode lead is coupled to the protection circuit by welding or other methods, and the other side is coupled to electrode terminal of the cell body by welding or other methods. Miniaturization, slimness and weight reduction of the battery leads to small size of respective components constituting the battery and thus coupling of components requires a high precision process. As a result, under the condition that electrode leads are coupled to the protective circuit, coupling electrode leads to the electrode terminals of the cell body requires a high degree of precision. In order to precisely perform coupling, perforated holes are consecutively formed on the protection circuit and cap housing such that coupling sites of electrical leads to the protection circuit can be exposed to the upper part of the battery, and under the condition that the protective circuit and cap housing are mounted on the upper part of the cell body, the electrode leads and electrode terminals of the cell body can be electrically connected through the perforated holes by laser welding, spot welding or the like. Detailed content on such electrical connection manner is disclosed in Korean Patent Application No. 2004-9502, filed by the present applicant, the disclosure of which is incorporated by reference herein in its entirety.

If the electrode leads are mounted on the protection circuit, the electrode leads are preferably of an elastic structure, and thus firm physical contact and electrical connection can be achieved by coupling of the cap assembly to the cell body without welding.

Formation of electrode terminals on the cell body is not particularly limited. For example, either one of positive and negative terminals is formed on the upper part of the cell body and the other one is formed on the lower part of the cell body, or alternatively both terminals are formed on the upper part of the cell body. When one of the electrode terminals is formed on the lower part of the cell body, as in the former case, the electrode terminal can be electrically connected with the cap assembly using a nickel plate or the like, as shown in FIG. 3. When both terminals are formed on the upper part of the cell body as in the latter case, all of the electrode terminals may be in the protruded form or only one of the electrode terminals may be in the protruded form, or alternatively all of them may not be protruded.

In one embodiment of the present invention, two electrode terminals are protruded from the upper part of the cell body, steps are formed on the front part of the electrode terminal side, and the cap assembly is formed detachably from steps on the electrode terminal side of the cell body.

Secondary batteries that can be utilized in the present invention are not particularly limited and are preferably lithium secondary batteries producing high output power relative to weight. Although there is no particular limit to the shape of the battery, it is preferably small, lightweight, and square. In addition, the secondary battery in accordance with the present invention is most suited to use as an inner pack battery.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, the present invention will be described in more detail with reference to the accompanying drawings, which are provided only for illustrating the present invention and should not be construed as limiting the scope and spirit of the present invention.

Figure 5:
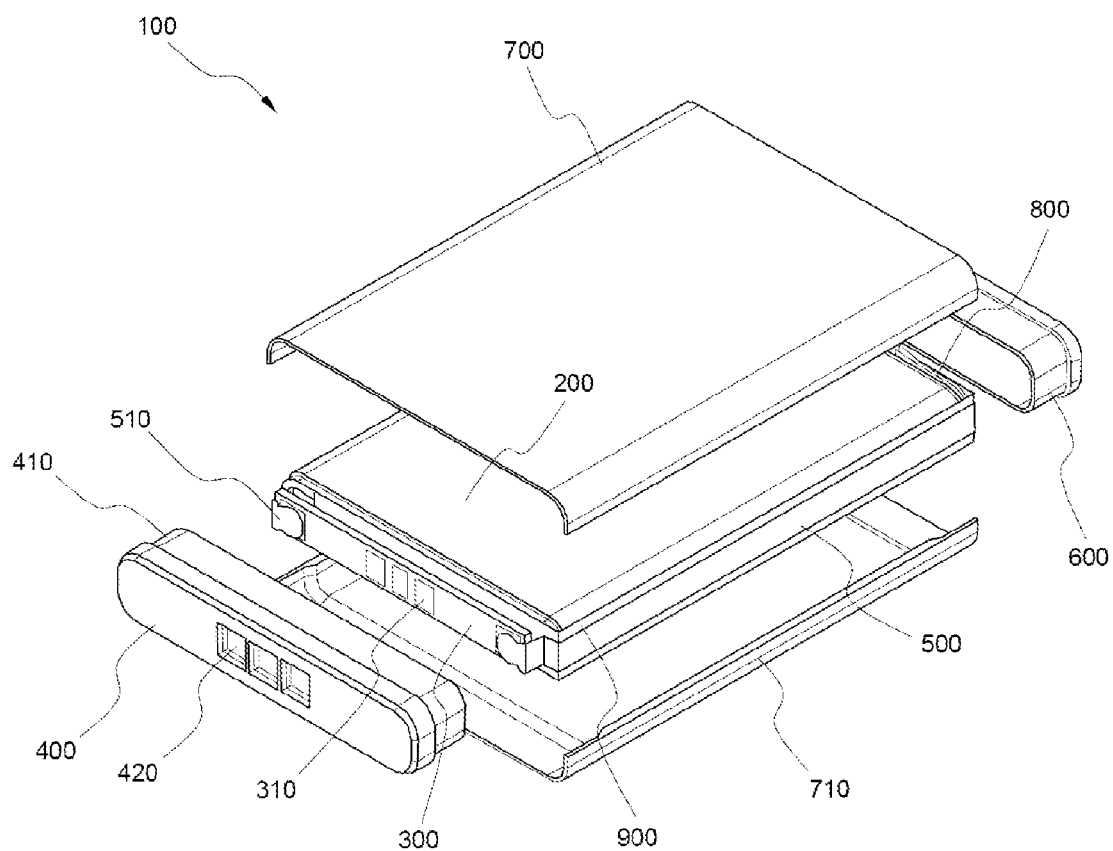
FIG. 5 is a partially exploded perspective view of a secondary battery in accordance with one embodiment of the present invention.

FIG. 5 schematically shows a partially exploded perspective view of a secondary battery in accordance with one embodiment of the present invention.

Referring to FIG. 5, the secondary battery 100 is composed of a cell body 200 wherein an electrode assembly of cathode/separator/anode (not shown) is built in a case; a protection circuit 300 for controlling charge/discharge of the battery 100; a cap housing 400 coupled to the upper part of the cell body 200 while including the protection circuit 300; nickel plates 500 and 510 for electrically connecting electrode terminals of the cell body 200 to the protection circuit 300, as electrode leads; a bottom cap 600 coupled to the bottom of the cell body 200; and upper and lower packaging labels 700 and 710, which are attached to the outer surfaces of the cell body 200, in the state the above-mentioned components are coupled.

The cap housing 400 is coupled to the upper part of the cell body 200 in the state that the cell body 200 and protection circuit 300 are electrically connected via nickel plates 500 and 510, wherein the cap housing 400 includes downwardly extending lateral parts 410 so as to enclose those components, and the upper side surfaces of the cell body 200 are fitted into the extended lateral parts 410 thereby resulting in coupling assembly. In addition, the cap housing 400 has openings 420 formed on the upper surface thereof, so as to expose external connection terminals 310 of the protection circuit 300.

Among the electrode terminals of the cell body 200, the positive terminal, for example, is formed on the bottom of the cell body and the other electrode terminal, for example the negative terminal, is formed on the top thereof. The positive terminal formed on the bottom of the cell body is connected to the corresponding terminal of the protection circuit 300 by the nickel plate 500 via a PTC element 800, and the negative terminal formed on the top of the cell body is connected to the corresponding terminal of the protection circuit 300 by another nickel plate 510. An insulating member 900 is intercalated between the cell body 200 and nickel plates 500 and 510 and the protection circuit 300, in order to prevent short-circuiting due to unnecessary connection therebetween.

Figure 1:
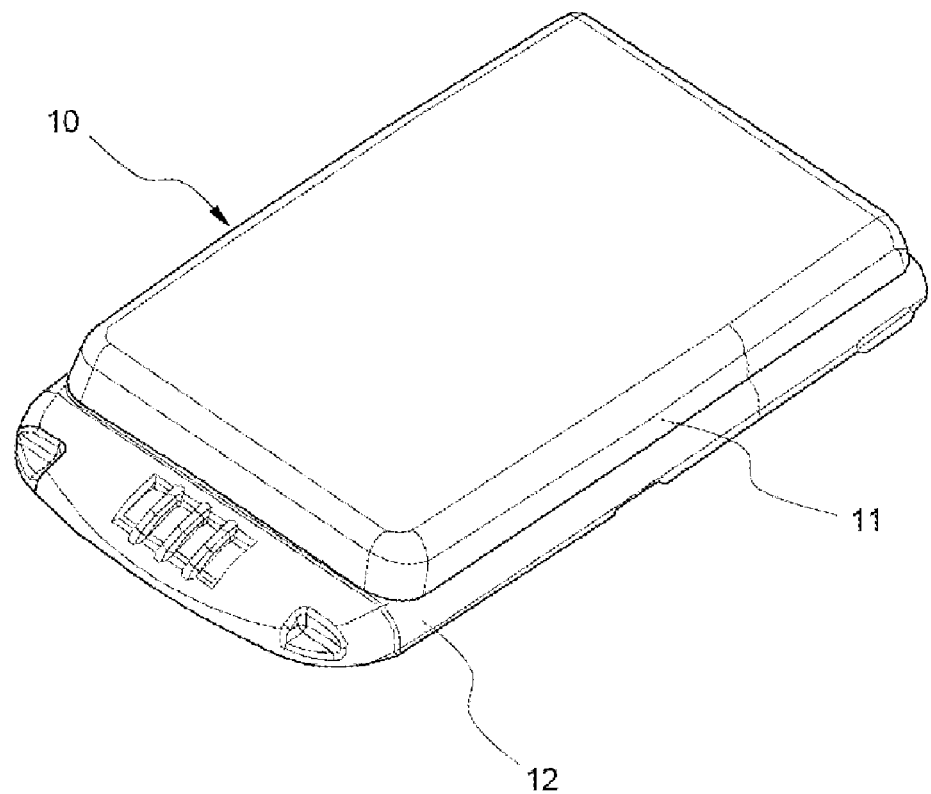
FIG. 1 is a schematic diagram of a hard pack type secondary battery.
Figure 2:
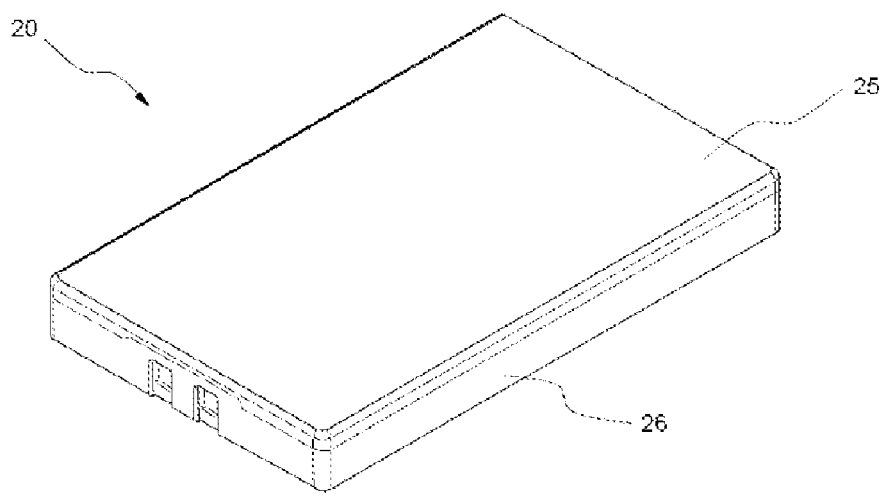
FIG. 2 is a schematic diagram of an inner pack type secondary battery in accordance with a conventional art.
Figure 3:
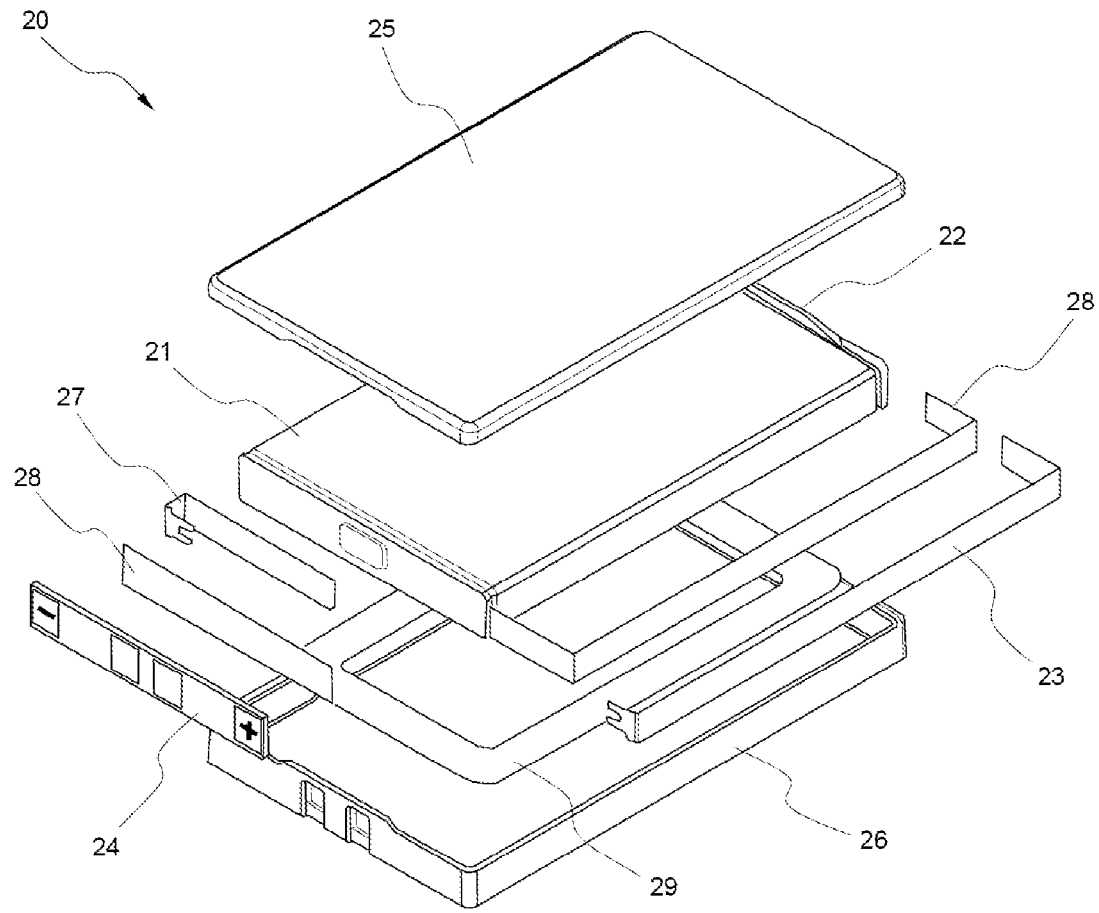
FIG. 3 is an exploded perspective view of a secondary battery in FIG. 2.
Figure 4:
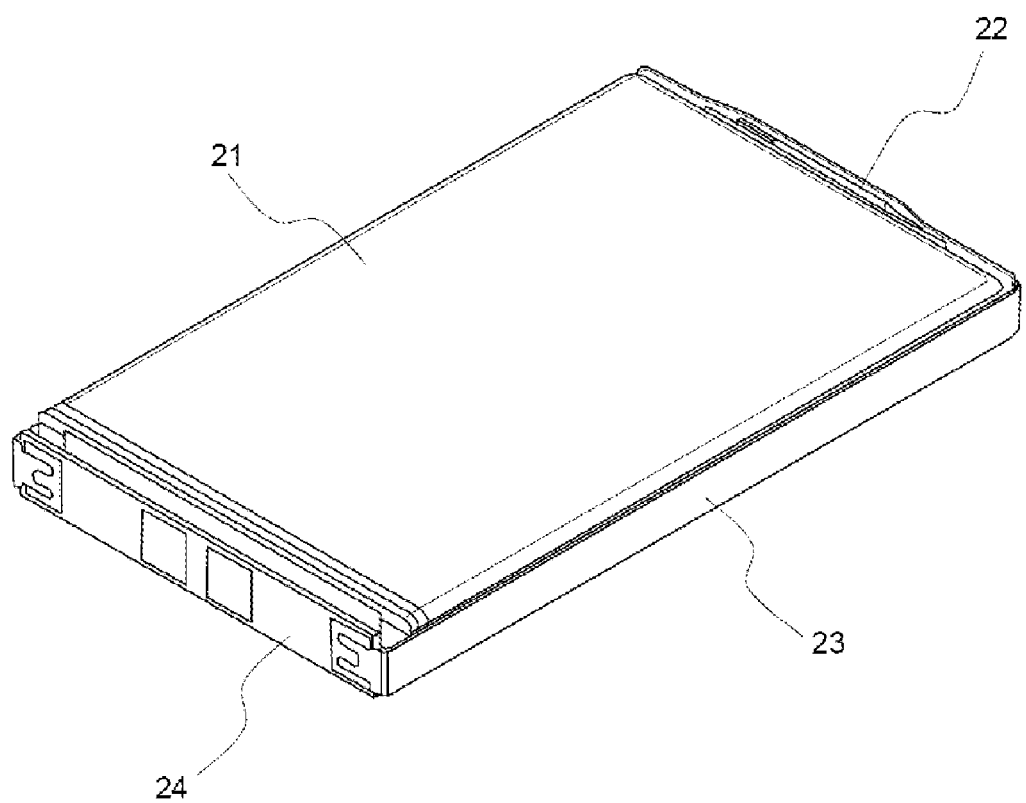
FIG. 4 shows a partially coupled state of the secondary battery in FIG. 3.

In the state that the above-mentioned constitutional components of the battery are coupled to one another, the packaging labels 700 and 710 applied to the outer surface of the cell body 200 serve to protect the outer surface of the battery and further enhance the degree of coupling between the cell body 200 and cap housing 400. Unlike conventional top/bottom cases (reference numerals 25 and 26 in FIG. 3), the top and bottom packaging labels 700 and 710 are attached to the corresponding parts of the cell body 200, cap housing 400 and bottom cap 600 without need for inter-coupling thereof by ultrasonic welding, and thus there is not required a thickness greater than the predetermined size and an assembly process is simplified.

Figure 6:
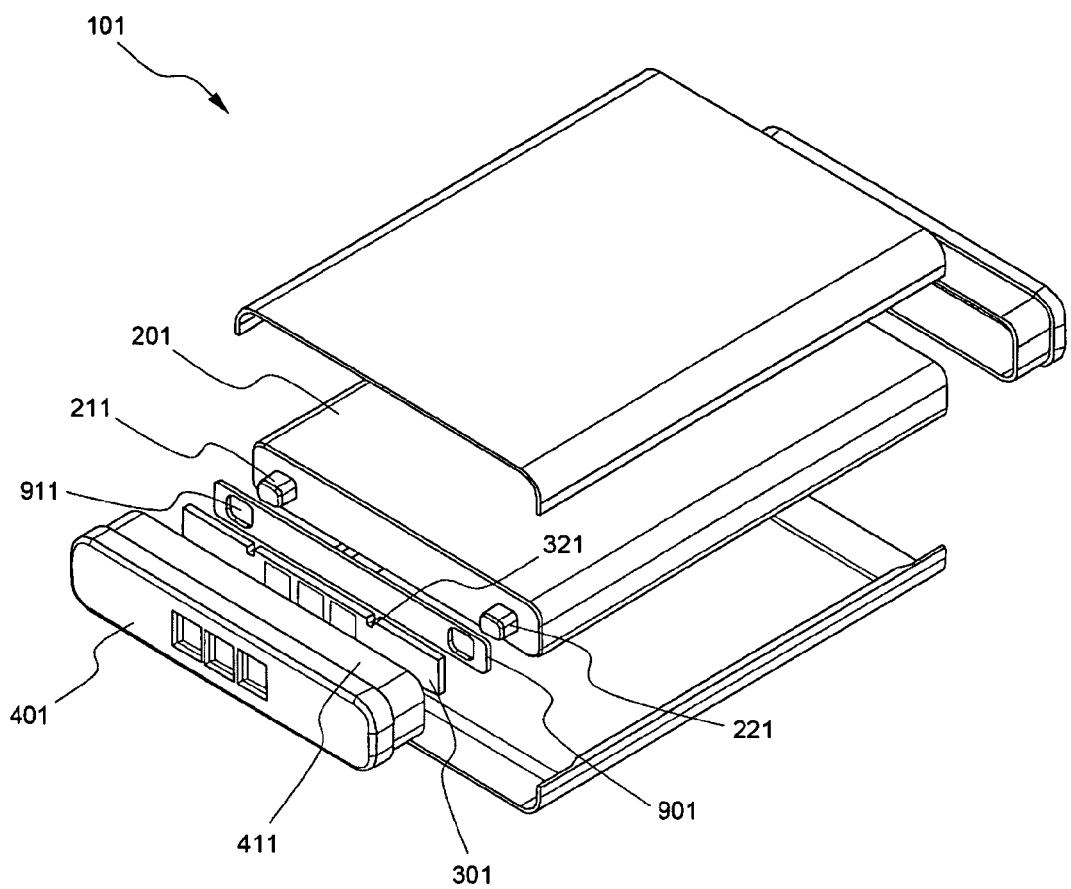
FIG. 6 is a partially exploded perspective view of a secondary battery in accordance with another embodiment of the present invention.

FIG. 6 schematically shows a partially exploded perspective view of a secondary battery in accordance with another embodiment of the present invention.

Referring to FIG. 6, the secondary battery 101 is characterized by projection of the electrode terminals 211 and 221 from the upper surface of the cell body 201. In addition, since electrode terminals 211 and 221 are formed on the top part of the cell body 201, an insulating member 901 is also disposed between the cell body 201 and a protection circuit 301 and the insulating member 901 is provided with perforated holes 911 through which electrode terminals 211 and 221 can pass. And, guide grooves 321 are formed on two corners of the protection circuit 301, and in line with the guide grooves 321, projection ribs (not shown) are formed on the inner surface of the extended lateral parts 411 of a cap housing 401. Therefore, the protection circuit 301 can be stably mounted on the extended lateral parts 411 of the cap housing 401 by guidance of the guide grooves 321 and projection ribs.

Figure 7:
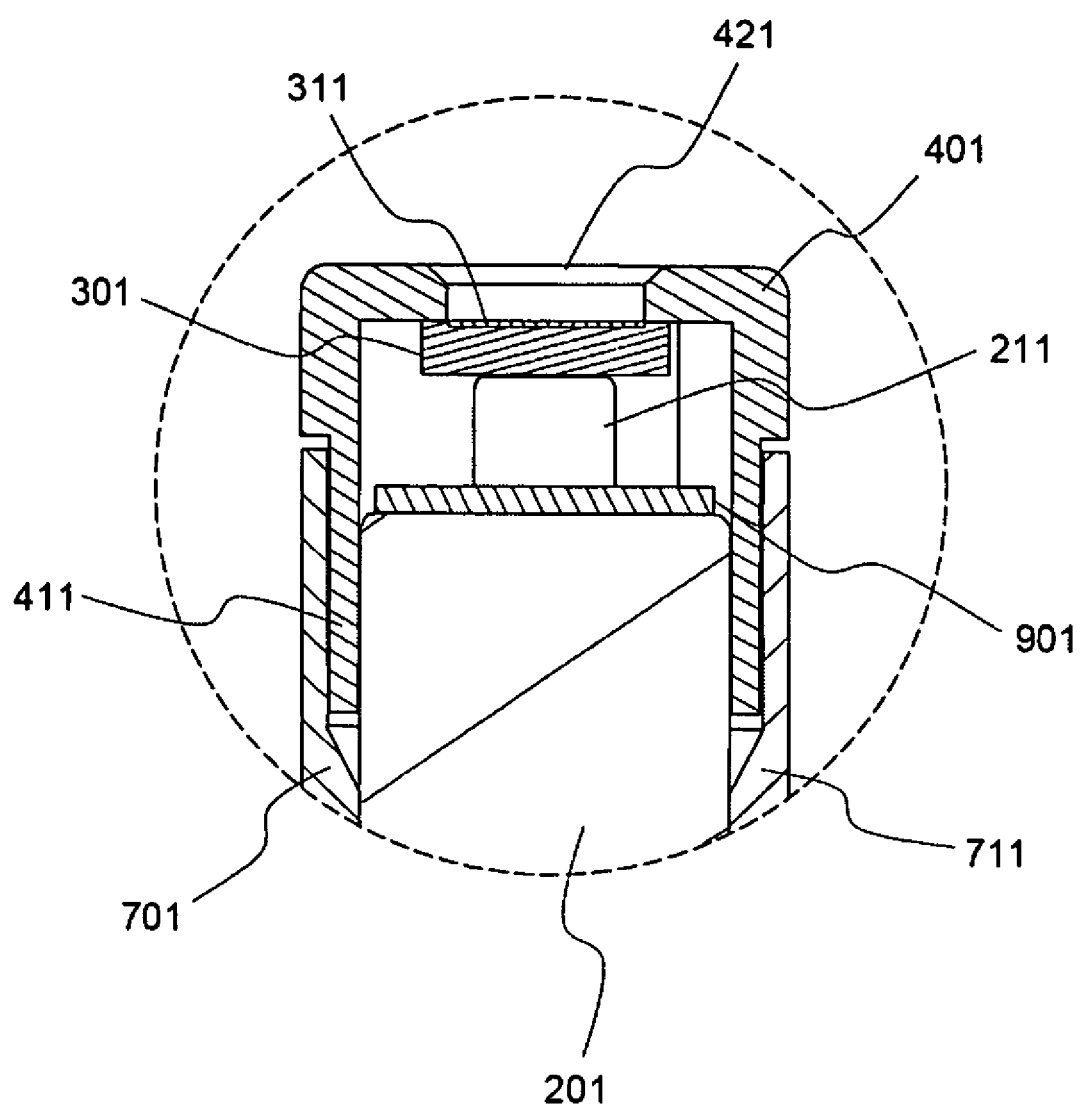
FIG. 7 is a schematic cross-sectional view showing the coupled state of the upper part of the secondary battery in FIG. 6.

FIG. 7 is a schematic cross-sectional view showing the coupled state of the upper part of the battery in the state that the secondary battery in FIG. 6 is assembled. Thicknesses and dimensions of some components are exaggerated for clarity.

Referring to FIG. 7, the inner surface of the extended lateral parts 411 of the cap housing 401 are inter-coupled with the upper outer surface of the cell body 201 by tight adherence therebetween. Such coupling is further firmly effected by packaging labels 701 and 711 which are simultaneously attached to the extended lateral parts 411 of the cap housing 401 and the upper outer surface of the cell body 201. In addition, by such coupling, the electrode terminal 211, protruding through the insulating member 901, is electrically connected to the protection circuit 301 without an additional contact means, and the external input/output terminal 311 of the protection circuit is exposed to the outside through the opening 421 of the cap housing 401.

Figure 8:
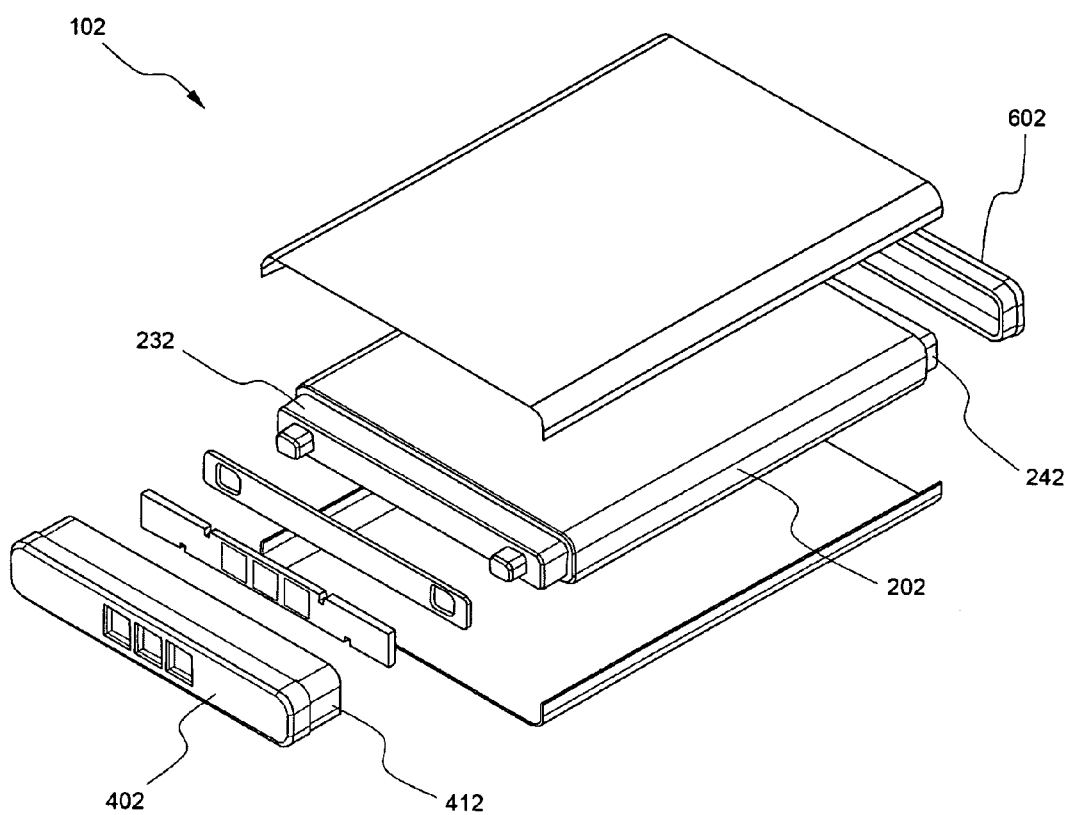
FIG. 8 is a partially exploded perspective view of a secondary battery in accordance with a further embodiment of the present invention.
Figure 9:
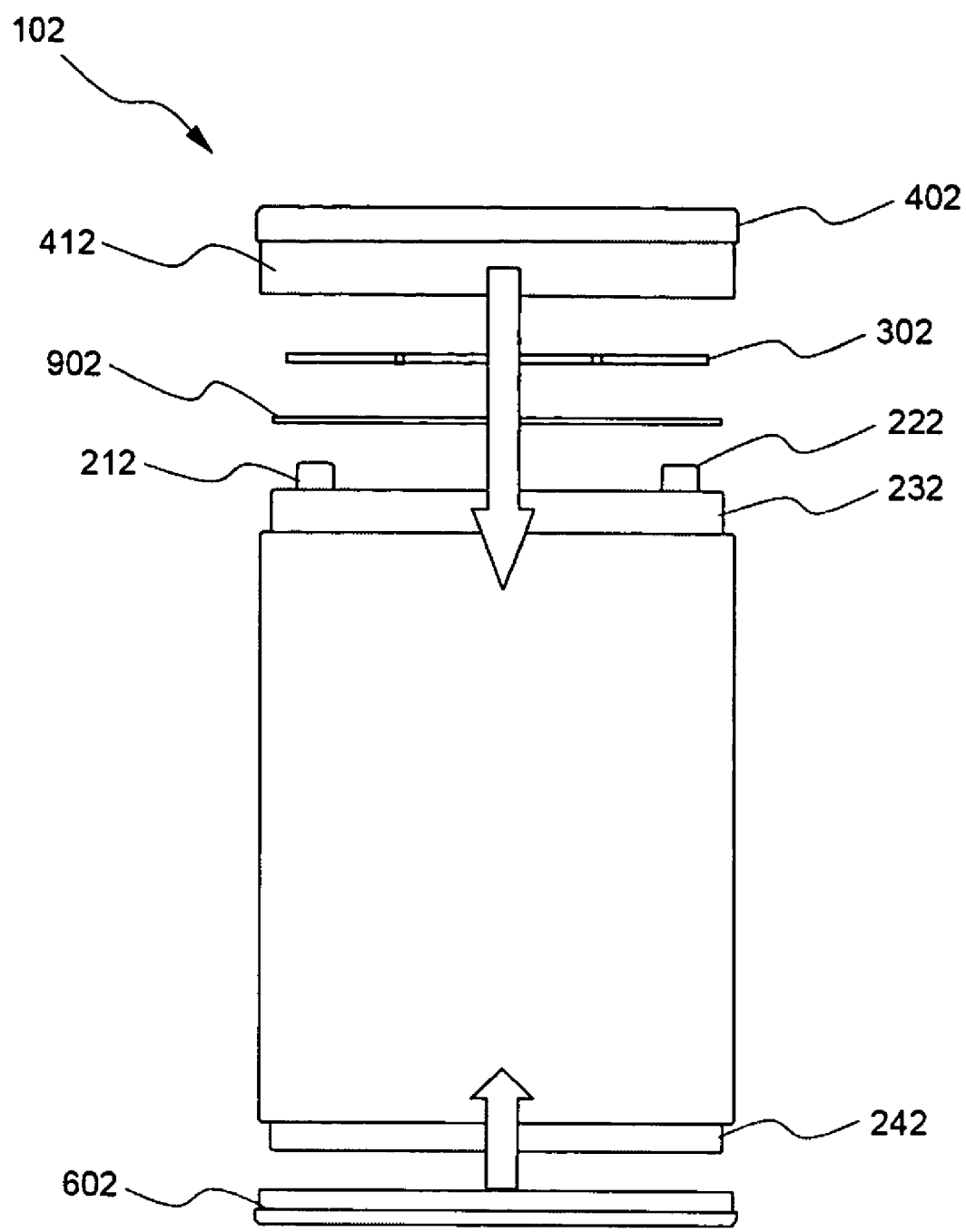
FIG. 9 is a schematic diagram illustrating the assembly process of the secondary battery in FIG. 8.
Figure 10:
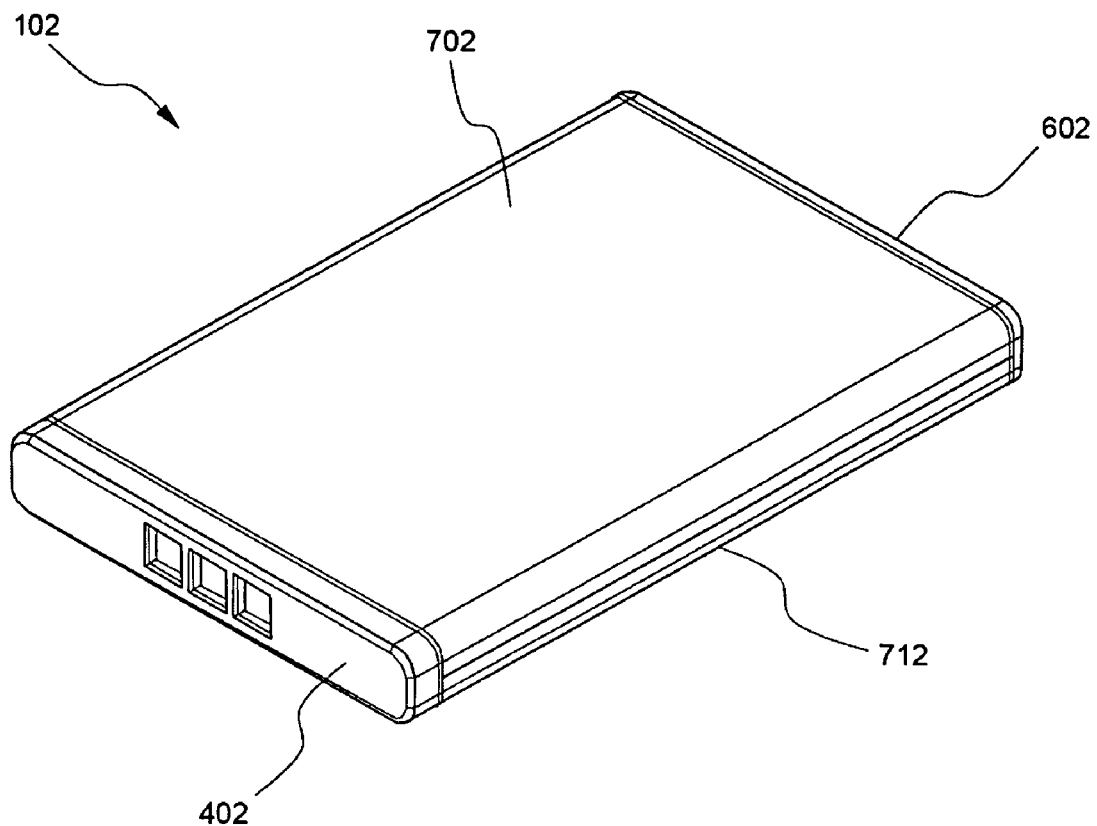
FIGS. 10 and 11 are, respectively, a perspective view and side view of the assembled secondary battery in FIG. 9.
Figure 11:
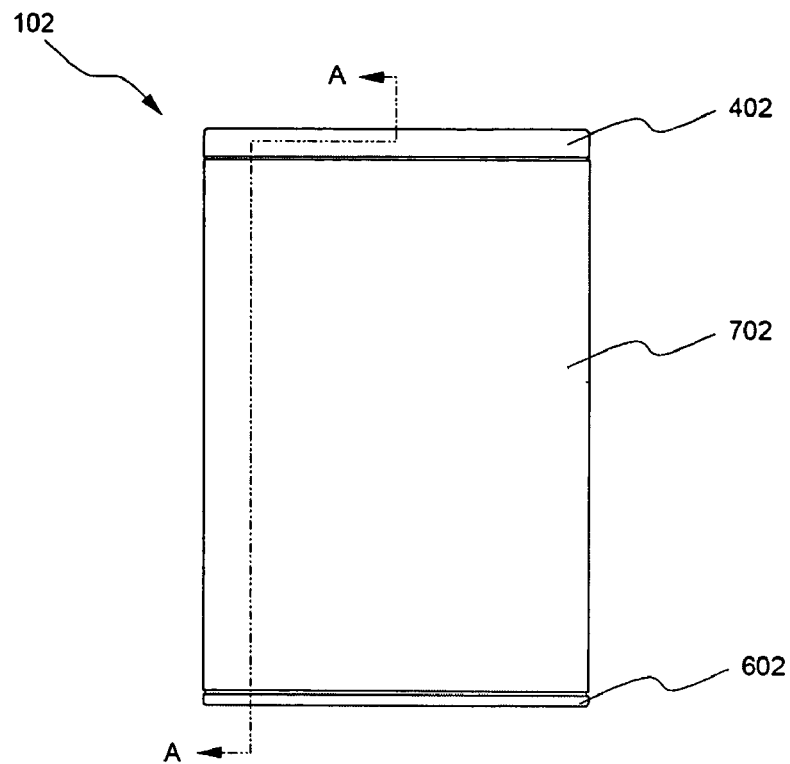
Figure 12:
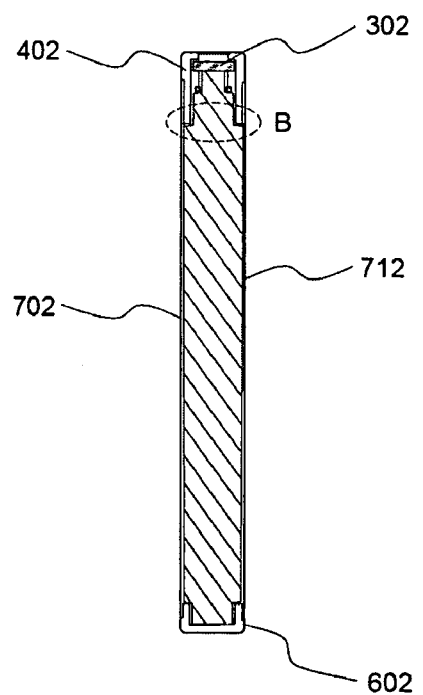
FIG. 12 is a cross-sectional view of the battery taken along line A-A in FIG. 11.

FIG. 8 schematically shows a partially exploded perspective view of a secondary battery in accordance with a further embodiment of the present invention. In addition, FIG. 9 schematically shows an assembly process of the secondary battery in FIG. 8, FIGS. 10 and 11 show a perspective view and side view of the assembled secondary battery, respectively, and FIG. 12 is a cross-sectional view of the battery taken along line A-A in FIG. 11.

Referring to FIG. 8 first, the secondary battery 102 is characterized in that a step 232 is formed on the outer surface of the upper part of the cell body 202 to which the extended lateral parts 412 of a cap housing 402 are coupled. Thus, in the state that the cap housing 402 is coupled to the top of the cell body 202, the extended lateral parts 412 of the cap housing 402 are not protruded from the outer surface of the cell body 202. In addition, the cell body includes another corresponding step 242 on outer surface of the bottom thereof to which the bottom cap 602 is coupled.

Referring to FIGS. 9 through 12, the protection circuit 302 is aligned facing the inner surface of the cap housing 402 and then the protection circuit 302 is fitted into the cap housing 402 such that guide grooves (not shown) of the protection circuit 302 are fitted into projection ribs (not shown) of the extended lateral parts 412 of the cap housing.

Next, in the state that the insulating sheet 902 is fitted into the front side of the step 232 on two electrode terminals 212 and 222 side of the cell body 202, the cap housing 402, which had accommodated the protection circuit 302, is press-fitted into the step 232 on electrode terminals 212 and 222 side of the cell body 202. Additionally, the bottom cap 602 is press-fitted into the lower step 242 of the cell body 202.

Next, packaging labels 702 and 712 are tightly attached to the cell body 202 and the upper and lower parts of caps 402 and 602 in such a manner that the cell body 202 and portions of both caps 402 and 602 (specifically, the extended lateral parts) are enclosed.

In this manner, the assembled secondary battery 102, as shown in FIGS. 10 through 12, exhibits a high degree of coupling and simplified outer surface. The secondary battery having such a structure is particularly preferred as the inner pack secondary battery.

Figure 13:
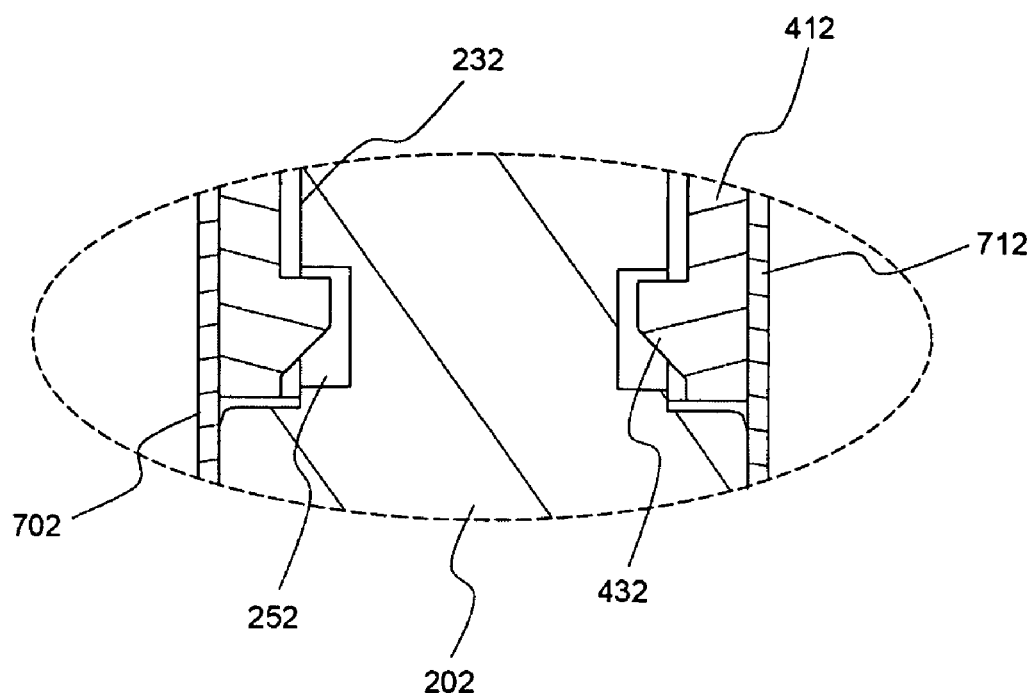
FIG. 13 is a modification in accordance with one embodiment of the present invention made on coupling site (B) of FIG. 12.

FIG. 13 shows a preferred modification made to the coupling site (B) of FIG. 12.

Referring to FIG. 13, in order to enhance coupling between the cap housing and cell body, elastic hooks 432 are formed on the lower parts of the extended lateral parts 412 of the cap housing, and the cell body 202 has an engagement grooves 252 corresponding to the hooks 432. The elastic hooks 432 of the extended lateral parts 412 of the cap housing are slidably pushed into the engagement grooves 252 along the outer surfaces of the steps 232 of the cell body 202 and thus can be firmly fixed therein. The packaging labels 702 and 712 are applied to the outer surfaces of the coupling sites.

Figure 14:
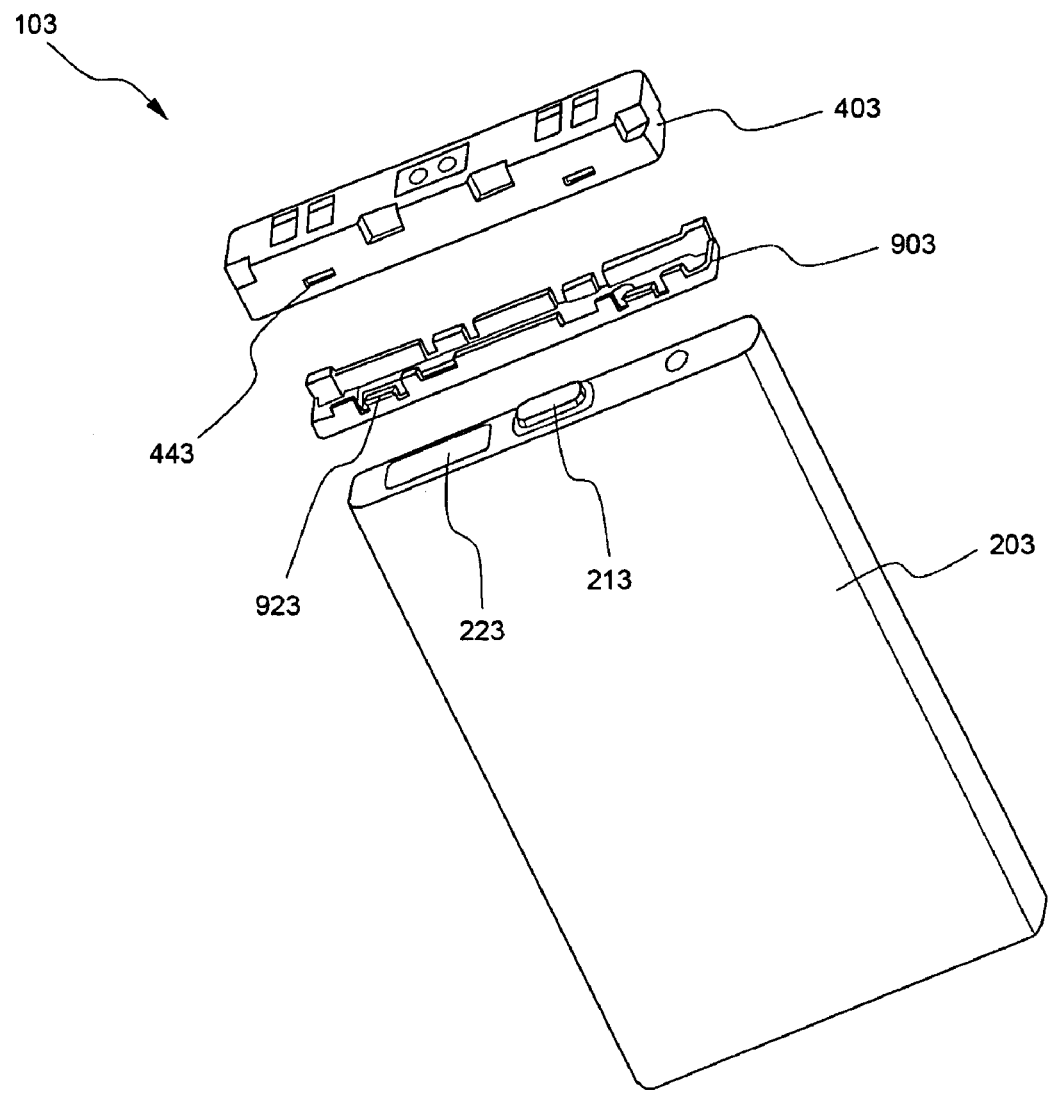
FIG. 14 is an exploded perspective view of a secondary battery in accordance with still further embodiment of the present invention.

FIG. 14 schematically shows an exploded perspective view of a secondary battery in accordance with still further embodiment of the present invention.

Referring to FIG. 14, the secondary battery 103 is characterized in that the insulating member 903, mounted on the upper part of the cell body 203, is in the form of a characteristic structure such that cap assembly components including the protection circuit, safety elements (not shown) or the like can be easily mounted. Therefore, the upper part of the insulating member 903 includes a plurality of grooves and projections such that battery components can be mounted while being insulated from the cell body 203, except for the electrical connection sites of electrode terminals 213 and 223 of the cell body 203. The insulating member 903 may be coupled with the cell body 203 in various manners, without being limited to the structure of FIG. 14. For example, coupling between the insulating member 903 and cell body 203 may be effected by applying an adhesive to the lower surface of the insulating member 903 and/or the upper surface of the cell body 203, followed by adhesion therebetween. Alternatively, coupling between the insulating member 903 and cell body 203 may also be effected by forming a portion or the entirety of the lateral parts of the insulating member 903 in the form of a downwardly extending structure as shown in the cap housing 400 of FIG. 5 and fitting the upper part of the cell body 203 thereinto. In the latter case, a step may be additionally formed on the upper part of the cell body as shown in FIG. 8. All of such various modifications should be construed as falling within the scope of the present invention.

In this manner, in the state that the insulating member 903 was coupled to the cell body 203, various cap assembly components are mounted (if necessary, some components may be mounted inside the cap housing), and then the cap housing 403 is coupled with the insulating member 903. For strong coupling, the elastic hooks 923 are formed on the side of the insulating member 903 and the engagement grooves 443 corresponding to the hooks 923 is formed on the cap housing 403.

If desired, the battery may have a structure such that, with or without such a combination of the elastic hooks 923 and engagement grooves 443, the extended lateral parts are formed on the cap housing 403 as shown in FIG. 5, the insulating member 903 or the upper part of the cell body 202 is fitted into the extended lateral parts, thus achieving coupling therebetween.

Figure 15:
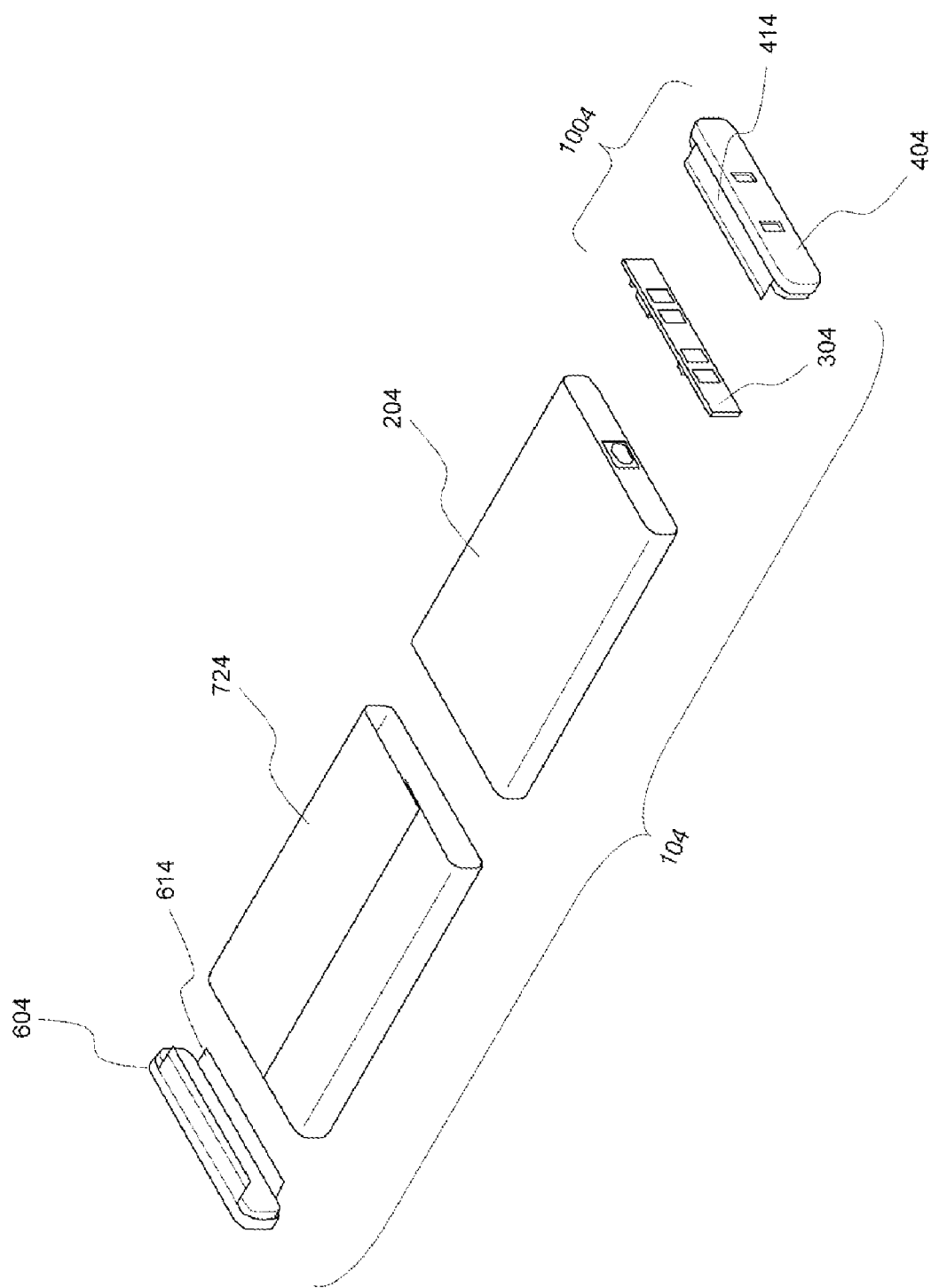
FIG. 15 is an exploded perspective view of a secondary battery in accordance with still yet embodiment of the present invention.

FIG. 15 schematically shows an exploded perspective view of a secondary battery in accordance with still yet embodiment of the present invention.

Referring to FIG. 15, the secondary battery 104 has a feature in that the extended lateral parts 414 of the cap housing 404, which are coupled to the cell body 204, are formed only on both sides of the lateral parts of the cap housing 404, not on the entirety thereof. Spacing width between extended lateral parts 414 may be slightly smaller than the thickness of the cell body 204, thereby realizing flexible coupling. Further, in the bottom cap 604, the extended lateral parts 614 may be formed only on both sides of the lateral parts, as in the cap housing. In addition, since the packaging label 724 applied to the cell body 204 is in the form of a film, the label 724 is attached to and encloses battery components in the state that the cap assembly 1004 including the protection circuit 304 and cap housing 404, and bottom cap 604 are coupled to the upper and lower ends of the cell body 204, respectively.

Figure 16:
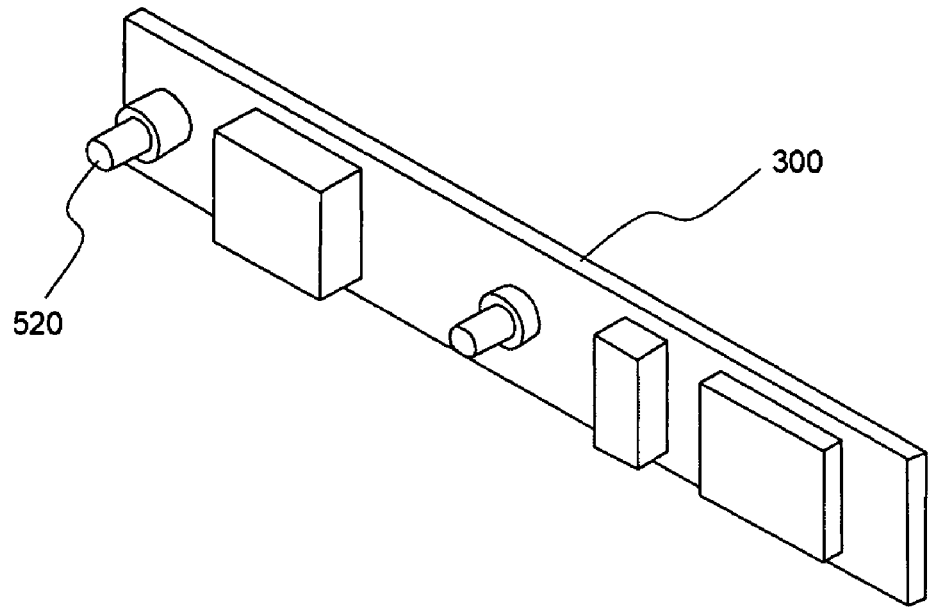
FIGS. 16 through 18 are, respectively, schematic views of protective circuit having various electrode leads mounted thereon, wherein electrode leads can be electrically connected to the cell body without use of welding, in accordance with one embodiment of the present invention.
Figure 17:
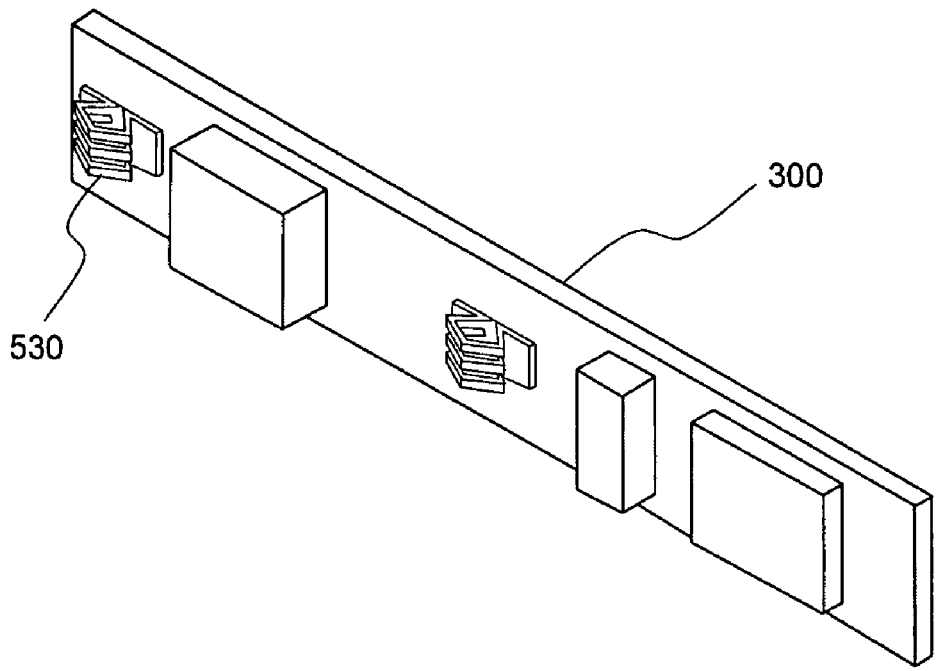
Figure 18:
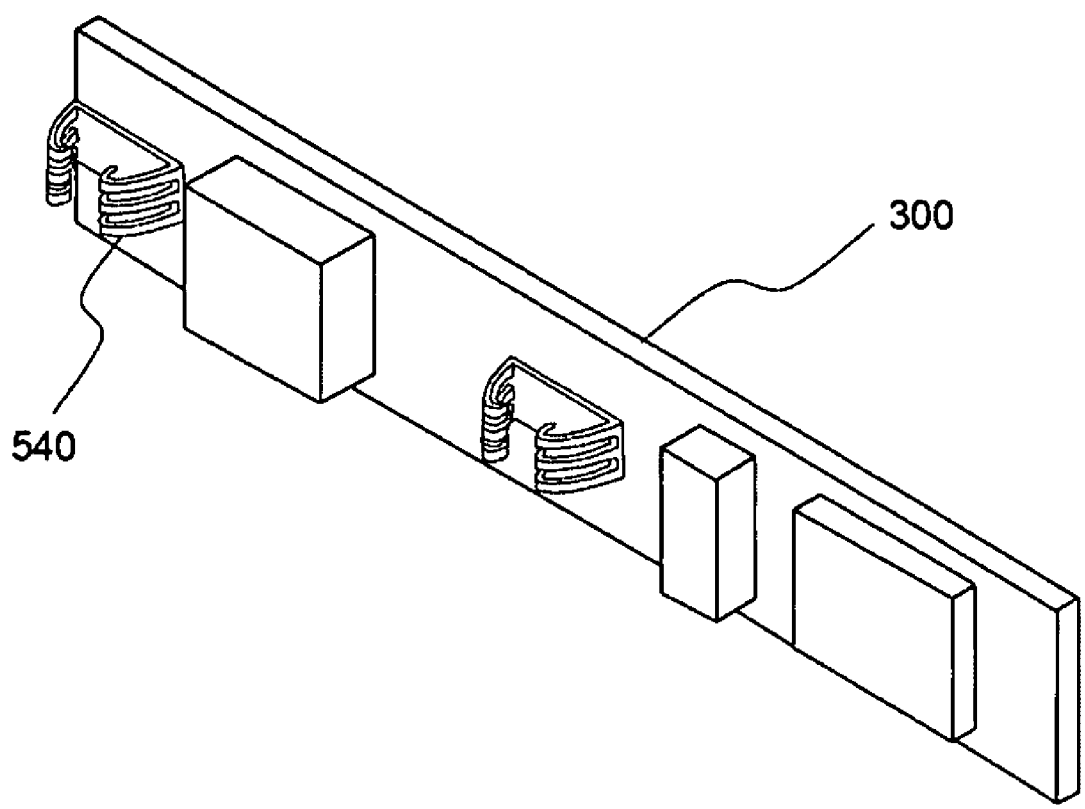

FIGS. 16 through 18 schematically show structures of protection circuits having various electrode leads mounted thereon, wherein electrode leads can be electrically connected to the cell body without use of welding, in accordance with one embodiment of the present invention.

Referring to these figures, electrode leads 520, 530 and 540, which are attached to the bottom surface of the protection circuit 300, are made of conductive elastic members, and when the protection circuit 300 is tightly adhered to the cell body (not shown), may be elastically contacted with electrode terminals of the cell body due to structural characteristics thereof. The electrode lead 520 shown in FIG. 16 is in the form of a spring contact pin, and electrode leads 530 and 540 shown in FIGS. 17 and 18 are in the form of a plate spring. Thus, electrical connection between the electrode leads and electrode terminals of the cell body can be made by tight adherence of the protection circuit 300 to the cell body without use of welding.

INDUSTRIAL APPLICABILITY

As described above, in accordance with the present invention, since the cap assembly including the protection circuit, cap housing and the like, is assembled detachably from the cell body, and electrically connected to and also can be physically firmly fixed to one another, provided are effects capable of greatly reducing the manufacturing process steps of the battery, and solving all the problems associated with use of battery cases and insert injection molding. Therefore, the present invention can reduce battery production costs and rejection rate, facilitate greater ease of re-working upon occurrence of rejection in particular components and realize more efficient automation of the battery manufacturing process.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery of an assemble-type structure, comprising:
    a cell body including an electrode assembly of cathode/separator/anode sealed therein; and
    a cap assembly including a protection circuit electrically connected to the cell body and a cap housing enclosing a portion of the battery, and being detachably coupled to the cell body,
    wherein electrode terminals of the cell body are protruded from an upper part of the cell body and the protection circuit is mounted on the cell body, thereby resulting in electrical connection therebetween;
    wherein detachable coupling between the cell body and cap assembly is accomplished by extended lateral parts of the cap housing, wherein the lateral parts have a structure in which both sides or an entirety of the lateral parts of the cap housing extend downward to the cell body, such that the cap housing of the cap assembly can be tightly adhered to an upper lateral side of the cell body; and
    wherein steps are formed on sides of the cell body, to which the extended lateral parts of the cap housing are tightly adhered, such that the extended lateral parts of the cap housing are not protruded from the sides of the cell body, in a state that the cell body and the cap housing are coupled.

2. The battery as set forth in claim 1, wherein, engagement projections are formed on extended lateral parts of the cap housing or an upper part of the cell body and engagement grooves corresponding to the engagement projections are formed on the upper part of the cell body or the extended lateral parts of the cap housing.

3. The battery as set forth in claim 1, wherein packaging labels are attached to sides of the cell body including coupling sites between the cap housing and cell body.

4. The battery as set forth in claim 1, wherein guide grooves are formed on either of at least two corners of the protection circuit and inner wall of the cap housing enclosing the protection circuit, and projection ribs corresponding to the guide grooves are formed on the other.

5. The battery as set forth in claim 1, wherein a safety element is further included upon electrical connection between electrode terminals of the cell body and protection circuit.

6. The battery as set forth in claim 5, wherein the safety element is a positive temperature coefficient (PTC) element.

7. The battery as set forth in claim 1, wherein, in order to prevent short-circuiting due to unnecessary connection between the protection circuit and cell body, an insulating member is further mounted on the upper part of the cell body.

8. The battery as set forth in claim 7, wherein the insulating member is in the form of a film or is in the form of a structure on which some components of the cap assembly are readily mountable.

9. The battery as set forth in claim 8, wherein in the case that the insulating member is the structure for easily mounting some components of the cap assembly, the insulating structure is coupled to the upper part of the cell body by adhesion, welding, or engagement, to form a portion of the cell body, and the cap assembly is detachably coupled to the insulating structure.

10. The battery as set forth in claim 1, wherein the steps are formed on a front part of an electrode terminal side of the cell body, and the cap assembly is formed detachably from the steps on the electrode terminal side of the cell body.

11. The battery as set forth in claim 1, wherein the battery is a lithium battery.

12. The battery as set forth in claim 1, wherein the battery is a square-shaped battery.

13. The battery as set forth in claim 1, wherein the battery is an inner pack battery.

* * * * *